United States Patent [19]

Shih

[11] Patent Number: 4,824,940

[45] Date of Patent: Apr. 25, 1989

[54] PARTIALLY DEAMIDATED OILSEED PROTEINS AND PROCESS FOR THE PREPARATION THEREOF

[75] Inventor: Frederick S. Shih, Kenner, La.

[73] Assignee: The United States of America as represented by the Secretary of Agriculture, Washington, D.C.

[21] Appl. No.: 54,562

[22] Filed: May 27, 1987

[51] Int. Cl.[4] .......................... A23J 1/12; A23J 1/14
[52] U.S. Cl. ................................. 530/377; 426/656; 530/378
[58] Field of Search ............................... 530/377, 378

[56] References Cited

PUBLICATIONS

Journal of American Oil Chemists Society, vol. 63, No. 4, Apr. 1986, pp. 472, 474, Shih et al.
Steinhardt, J. and Charles H. Fugitt; J. Res. Natl. Bur. Standards, 29, 315, (1942).
Paulson, Jack C., et al., J. American Chemical Society, 75, 2039, (1953).
Whitaker, John R. and F. E. Deatherage, American Chemical Society, 77, 3360, (1955).
Meyerson, Laurence R. et al., Analytical Biochemistry, 86, 287, (1978).
Adler-Nissen, Jens, Journal Agricultural and Food Chemistry, 27, 1256, (1979).
Mellon, Edward F., et al., Journal American Oil Chemists, 69, 827, (1947).
McWatters and John P. Cherry, J. Food Sci., 42, 1444, (1977).
Zarins, Z. M. and J. P. Cherry, J. Food Sci., 46, 1855, (1982).

Primary Examiner—Howard E. Schain
Attorney, Agent, or Firm—M. Howard Silverstein; Raymond C. Von Bodungen

[57] ABSTRACT

Partially deamidated oilseed proteins having improved functionality for food use are prepared by partial hydrolysis of oilseed proteins with long chain alkylsulfate, alkanesulfonate, or arylsulfonate catalysts under conditions which minimize hydrolysis of the peptide bonds.

10 Claims, No Drawings

PARTIALLY DEAMIDATED OILSEED PROTEINS AND PROCESS FOR THE PREPARATION THEREOF

BACKGROUND OF THE INVENTION

1. Field of the Invention

This invention relates to edible food products produced by partial deamidation of oilseed proteins.

2. Description of the Prior Art

Oilseeds are a good source of low-cost protein, but the food value of the protein can often be improved by chemical or enzymatic modification. Enzymatic treatments have been reported to improve the solubility of oilseed proteins but sometimes destroy their emulsifying capacity and foam stability. Chemical modifications, using techniques which include sulfonation, succinylation, phosphorylation, and deamidation, invariably improve functionality of the oilseed proteins.

Of the chemical methods mentioned above, the hydrolysis of amide groups (deamidation) is particularly attractive because oilseed proteins have an unusually large number of such groups. Significant improvements in functionality can be achieved even at low levels of deamidation. Deamidation facilitates dissolution of the protein in water because more polar-charged glutamic and aspartic acid groups replace the less polar glutamine and asparagine groups during deamidation. The enhanced solubility enables the protein to better exert its surfactancy in lowering the surface tension between water and oil (emulsion) or water and air (foam) at their interface. The deamidated protein therefore becomes more valuable for food use because it is more soluble, more whippable, and has a greater ability to emulsify oil.

The extent of hydrolysis required to produce significant deamidation, however, requires the hydrolysis to be conducted under rather severe conditions involving temperatures of 100° C. or higher and strong acids such as HCl at concentrations of 0.5N or higher. Under these conditions, considerable degradation of the protein molecule occurs which causes undesirable changes in the protein such as bitter taste and reduced functionality. Specifically, while it is desirable to achieve a protein deamidation of 30% or higher for significant improvements in functionality, the concomitant peptide bond hydrolysis, at 6% or higher under normal deamidation conditions, will most likely have a major effect (often detrimental) on the functional properties of the treated protein.

Forty-five years ago, J. Steinhardt and C. H. Fugitt investigated the effect of various anions on protein hydrolysis, using wool as the water insoluble protein substrate and egg albumin as the water soluble protein substrate (J. Res. Natl. Bur. Standards 29, 315 (1942)). They reported that these proteins were hydrolyzed at the amide and peptide bonds more effectively in the presence of some long carbon-chain anions including alkylsulfates and alkanesulfonates. However, the study was not intended for practical applications and there was no recording of property changes which occurred to the wool and egg albumin from the above mentioned catalytic hydrolysis. Other investigations concern the uses of ion exchange resin as a catalyst for protein hydrolysis, J. C. Paulson et al., J. Am. Chem. Soc. 75, 2039 (1953); J. R. Whitaker and F. H. Deatherage, J. Am. Chem. Soc. 77, 3360 (1955). However, these latter studies are interested only in total protein hydrolysis and fail to distinguish between deamidation and peptide bond hydrolysis.

SUMMARY OF THE INVENTION

This invention relates to novel, edible, partially deamidated oilseed proteins having improved functional properties with respect to solubility, water binding, foam and emulsion capacity, and emulsion viscosity; and, to processes for their preparation which minimize peptide bond hydrolysis.

It is a principal object of the invention to prepare novel deamidated oilseed proteins which have improved functional properties with respect to solubility, water-binding, foam capacity, emulsion capacity and emulsion viscosity for food products intended for human consumption such as soybean, cottonseed, or peanuts.

Another object of the invention is to provide a method for deamidating oilseed proteins with minimum rupture of the peptide chains.

Other objects of the invention will become obvious from the description of the preferred embodiments.

DETAILED DESCRIPTION OF THE PREFERRED EMBODIMENTS

In the present invention, we demonstrate how to control the peptide bond hydrolysis during deamidation and develop novel methods for the preparation of deamidated oilseed proteins such as soybean, cottonseed, or peanut to make them more suitable for food use.

The conditions of the preferred embodiment with respect to temperature, time, pH and amount of catalyst are tailored to induce sufficient hydrolysis of the amide groups in the protein with limited occurrence of peptide bond hydrolysis. The reaction is carried out utilizing the anion of a long chain alkylsulfate, alkanesulfonate, or arylsulfonate as a catalyst. The catalyst can be a water soluble compound such as sodium dodecylsulfate, SDS, which effects rapid deamidation of the protein in solution. The catalyst can also be an insoluble sulfonated styrene/divinylbenzene copolymer, such as Dowex 50 ion-exchange resin, a product of the Dow Chemical Co., Midland, MI, which has the advantage of being readily removable from the reaction mixture. This feature of easy protein separation from the resin, either in batch or column application, should make this method attractive to the oilseed processing industry where scale-up is often a problem.

Any suitable oilseed protein in any suitable form, for example soy flakes, but preferably in somewhat refined form, for example soy isolate, can be used. By suitable oilseed protein is meant a source which contains oilseed protein which can be improved in functionality and which requires modification in order to improve its characteristics and suitability for human food use. Any suitable protein concentration, preferably in the range of 1 to 4%, can be used. The protein is dispersed and stirred in a suitable quantity of dilute acid and catalyst. The concentrations of acid and catalyst should be such as to maximize deamidation and minimize peptidation. For such purposes, a soluble catalyst such as SDS is usually utilized in a concentration of 0.2–0.6M in a solution with about 0.2–0.5N HCl. An insoluble catalyst such as Dowex 50 resin is utilized in a concentration of 1–10% of the total weight of the reaction mixture containing 0.02–0.10N HCl.

It is to be particularly observed that in the presence of catalyst, either soluble or insoluble, oilseed proteins undergo about 1.5 to 3.0 times as much deamidation, depending on temperature, as does oilseed protein in the absence of catalyst. It is further noted that temperature control is an important factor in regulating the extent of peptide bond hydrolysis during deamidation. In all cases, with or without catalysts, the ratio of deamidation of total protein hydrolysis (the sum of deamidation and peptide bond hydrolysis) decreases as the temperature increases. This ratio is also higher for the catalyzed reaction, particularly within certain temperature ranges depending on the protein and catalyst used. A lower temperature is more desirable for deamidation but, for practical applications, the deamidation temperature should be raised to the point at which substantial deamidation can be achieved in a reasonably short time but concomitant peptide bond hydrolysis does not significantly affect the properties of the protein. An exemplary temperature range of 60° to 95° C. is generally quite suitable for those purposes.

The proteins in the deamidation reaction are closely monitored with respect to the extent of deamidation by analyzing the amount of ammonia generated and to the extent of peptidation by analyzing the increase in free amino groups. The modified protein products, normally solubilized in the reaction solution, can be precipitated at the isoelectric point of the proteins, usually at a pH of about 4.0-5.0. The precipitated proteins, after being separated from the solubles by centrifugation and decantation, can be washed if necessary by appropriate solvents to remove undesirable coprecipitants such as the residual catalyst. The washed precipitate is then redissolved by adjusting the solution to about pH 6.5-7.5 and lyophilized.

Deamidated oilseed proteins offer considerable advantages-important in the preparation of food products- as compared with unmodified oilseed proteins. For proteins deamidated to 25-40%, solubility increases by 80-25%, water binding capacity by 130-220%, foam expansion by 130-170%, emulsion capacity by 160-200%, and emulsion viscosity by 190-300%.

The following discussion and examples are given to illustrate the preparation and properties of the deamidated proteins of this invention. The examples are given merely for purposes of illustration, and should not be construed as limiting the scope of the invention.

METHODS OF ANALYSIS

In the following examples, samples were analyzed for ammonia generated by partial deamidation by means of an ammonium electrode according to R. L. Meyerson, et al., [the procedure of which is herein incorporated by reference] Anal. Biochem. 86, 287 (1978), although other methods are also acceptable. Complete deamidation was achieved by hydrolysis with 2N HCl at 100° C. for 3 hrs. The degree of deamidation was then calculated as the ratio of ammonia generated in the deamidation of the test sample to that in the complete deamidation of the original sample. The increase in free amino groups in a sample (peptide bond hydrolysis) was analyzed by the trinitrobenzenesulfonic acid (TNBS) method, according to J. Adler-Nissen, [the procedure of which is herein incorporated by reference] J. Agric. Food Chem. 27, 1256 (1979). Complete peptide bond hydrolysis was achieved by hydrolysis with 6N HCl at 110° for 24 hrs. The degree of peptide bond hydrolysis was calculated as the ratio of free amino groups generated in the deamidation of the test sample to those in the complete peptide bond hydrolysis of the original sample.

Duplicate determinations were run on all functionally tests. Solubility was measured with 2% (w/v) suspensions of protein in water. The suspensions were adjusted to various pH values by dilute HCl or NaOH, stirred for 0.5 hrs and filtered. The filtrate was analyzed for nitrogen by the Kjeldahl method. Nitrogen solubility index (NSI) was determined by the standard AOCS method, using protein samples which were obtained by precipitation at pH 4.7. In other functionality tests, protein samples were obtained by freeze-drying the protein solution adjusted to pH 7. Water binding was measured at 84% relative humidity over saturated KCl at 30° C., according to E. F. Mellon et al [the procedure of which is herein incorporated by reference] J. Am. Oil. Chem. Soc. 69, 827 (1947). For measuring whipping ability, samples of 1 gm protein in 15 ml water were blended in a mixer for 1 min using a Sorvall Omni-mixer operated at speed 5. The foam was transferred immediately to a graduated cylinder for the determination of foam expansion. After standing for 1 hr, the residual foam volume was measured for the calculation of foam stability. Oil-in-water emulsions were studied, according to K. H. McWatters and J. P. Cherry, [the procedure of which is herein incorporated by reference] J. Food Sci. 42, 1444 (1977), by delivering peanut oil slowly from a burette into a suspension of protein and water during emulsion formation. Emulsion capacity was taken to be the point at which a sudden drop in viscosity occurred due to oil-water phase separation. The viscosity of the emulsion at the oil volume 10 ml before phase separation was recorded as the emulsion viscosity.

EXAMPLE 1

Defatted glandless cottonseed flour was extracted with water and then with 10% sodium chloride to isolate the storage protein as described by Z. M. Zarins and J. P. Cherry [the procedure of which is herein incorporated by reference] J. Food Sci. 46, 1855 (1982). To a suspension of the storage protein (4.0 gm) in SDS solution (0.1M, 200 ml) was added HCl (0.4N, 200 ml). The mixture was stirred at 70° C. in a constant temperature bath, and aliquots of supernatant solution were withdrawn at intervals for analysis. At the conclusion of the experiment, the mixture was cooled to room temperature and adjusted to pH 4.7 by dilute NaOH. The deamidated product was separated by centrifugation as an isoluble residue. The residue was washed to remove SDS first with a mixture of acetone, acetic acid, triethylamine and water (85:5:5:5) and then with acetone. The product was dried under vacuum at room temperature. The experimental details and functional properties of the deamidated cottonseed protein are shown in Table I.

TABLE 1

Effect of Deamidation on the Functional Properties of Cottonseed Protein

| Functional Properties | Deamidation (%)[a] | | | |
|---|---|---|---|---|
| | 0 | 27.0 | 32.5 | 42.0 |
| Water-binding capacity (%) | 22.5 | 27.7 | 35.2 | 48.0 |
| Foam expansion (%) | 126 | 168 | 180 | 213 |
| Foam stability (%) | 95 | 97 | 98 | 98 |
| Emulsion capacity (ml of oil) | 56.0 | 88.0 | 97.0 | 109.0 |
| Emulsion viscosity (cps × 1000) | 40 | 75 | 89 | 122 |
| Solubility (%) at | | | | |

TABLE 1-continued

Effect of Deamidation on the Functional Properties of Cottonseed Protein

| Functional Properties | Deamidation (%)[a] | | | |
|---|---|---|---|---|
| | 0 | 27.0 | 32.5 | 42.0 |
| pH 3.0 | 25.0 | 35.5 | 39.0 | 42.0 |
| pH 4.8 | 2.5 | 4.0 | 8.0 | 8.6 |
| pH 6.5 | 42.5 | 48.9 | 50.8 | 60.5 |

[a]Deamidations of 0, 27.0, 32.5, and 42.0% were obtained by the reaction of cottonseed protein (1%) with 0.2 N HCl and 0.02 M SDS at 70° C. for 0, 1, 2, and 3 hrs, respectively. Concomitant peptide bond hdrolysis of the deamidated proteins are 0, 1.0, 1.4, and 1.9%, respectively.

EXAMPLES 2-8

Deamidated cottonseed protein was produced following the same procedure of Example 1 except varying the acids and catalyst components as described in Table II. Of the common acids investigated, sulfuric acid and hydrochloric acid were the most effective, followed in decreasing order by phosphoric acid and acetic acid. Of the catalysts investigated, sodium dodecanesulfonate was about as effective as SDS, whereas sodium heptanesulfonate and Triton X-100 were less effective.

TABLE II

Deamidaion of Cottonseed Protein under the Same Conditions as Example 1 but Varying the Acid and Catalysts[a]

| Example # | Acid (0.02 N) | Catalyst (0.04 M) | Deamidation (%) |
|---|---|---|---|
| 2 | hydrochloric acid | sodium dodecylsulfate | 43.5 |
| 3 | sulfuric acid | sodium dodecylsulfate | 45.0 |
| 4 | phosphoric acid | sodium dodecylsulfate | 25.0 |
| 5 | acetic acid | sodium dodecylsulfate | 2.8 |
| 6 | hydrochloric acid | Triton X-100[b] | 8.0 |
| 7 | hydrochloric acid | sodium dodecanesulfonate | 39.0 |
| 8 | hydrochloric acid | sodium heptanesulfonate | 15.0 |

[a]Protein (1%) was heated at 70° C. for 2 hrs.
[b]1%.

EXAMPLES 9 and 10

Soy protein and peanut protein (1%) were each treated with 0.2N HCl and 0.04M SDS as described for cottonseed protein in Example 1. After 1.5 hr at 70°, the extent of deamidation was 33.7% for the soy protein and 27.8% for the peanut protein. Very little hydrolysis (less than 1.1%) of the peptide bonds occurred in either case. The functional properties of the modified and unmodified proteins are given in Table III.

TABLE III

Functional Properties of Soy and Peanut Proteins[a]

| | Example 9 (soy) | | Example 10 (peanut) | |
|---|---|---|---|---|
| | Deamidation (%) | | | |
| Functional properties | 0 | 33.7 | 0 | 27.8 |
| Water-binding capacity (%) | 25.5 | 54.0 | 35.0 | 60.0 |
| Foam expansion (%) | 120 | 198 | 129 | 190 |
| Foam stability (%) | 92 | 98 | 91 | 98 |
| Emulsion capacity (ml of oil) | 60 | 150 | 70 | 160 |
| Emulsion viscosity (cps × 1000) | 47 | 98 | 54 | 95 |
| Solubility (%) at | | | | |
| pH 3.0 | 25.0 | 30.3 | 40.4 | 51.1 |
| pH 4.8 | 2.0 | 12.0 | 12.0 | 21.7 |
| pH 6.5 | 30.9 | 45.5 | 58.9 | 88.0 |

[a]Protein (1%) was treated with 0.2 N HCl and 0.04 M SDS at 70° C. for 1.5 hrs. The controls (0% deamidation) were obtained at 0 hr of the same treatment.

EXAMPLE 11

Defatted soy flakes were extracted with water (1:20 w/w) at pH 7 for one hr. The extract was collected by filtering the mixture through 8 layers of cheesecloth. A mixture of soy extract (250 ml), dilute HCl (0.3N, 50 ml) and Dowex 50 resin (15 gm) was stirred at 67° C. in a two-neck round bottom flask, equipped with a stirrer and condenser, in a constant temperature bath. After reacting under various heating times, the reaction mixture was separated by filtration with a sintered glass funnel. The resin retained in the funnel was eluted with HCl (3N, 25 ml) to remove the absorbed hydrolytic products. The combined filtrate was adjusted with NaOH to pH 4.7 to precipitate the proteins which were subsequently separated from the solubles by centrifugation. The protein product was redissolved in water at pH 7.0 and then freeze dried. The functional properties of the deamidated soy protein are shown in Table IV.

TABLE IV

Effect of Deamidation on the Functional Properties of Soy Proteins

| | Deamidation (%)[a] | | |
|---|---|---|---|
| Functional properties | 0 | 30.7 | 40.3 |
| NSI (%) | 36.0 | 64.8 | 84.6 |
| Emulsion capacity (ml of oil) | 52 | 89 | 102 |
| Emulsion viscosity (cps × 1000) | 45 | 95 | 130 |
| Foam expansion (%) | 118 | 156 | 194 |
| Foam stability (%) | 94 | 96 | 98 |
| Water-binding (%) | 24.5 | 58.7 | 72.0 |

[a]Deamidation of 0, 30.7, and 40.3 were obtained at 67° C. and with other conditions as described in Example 11 for 0, 24, and 48 hrs, respectively. Concomitant peptide bond hydrolysis of the deamidated proteins were 0, 1.2, and 1.5%, respectively.

I claim:

1. A partially deamidated oilseed protein having improved functional properties with respect to solubility, water-binding, foam capacity, emulsion capacity and emulsion viscosity, wherein the partially deamidated oilseed protein has greater than 30% deamidation and no more than 2% peptide bond hydrolysis.

2. The product of claim 1 wherein the oilseed is selected from the group consisting of soybean, cottonseed, and peanut.

3. A process for preparing a partially deamidated oilseed protein having improved functional properties with respect to solubility, water-binding, foam capacity, emulsion capacity, and emulsion viscosity, which comprises agitating a suspension of the oilseed protein in an aqueous solution containing a mineral acid and a catalyst selected from the group consisting of long chain alkylsulfates, alkanesulfonates and arylsulfonates, holding the suspension for sufficient time and temperature to achieve partial deamidation, and recovering the partially deamidated oilseed protein from the resulting mixture, wherein the partially deamidated oilseed protein had greater than 30% deamidation and no more than 2% peptide bond hydrolysis.

4. The process of claim 3 wherein the protein concentration is from about 1% to about 4%.

5. The process of claim 3 wherein the catalyst is a soluble compound selected from the group consisting of long chain alkylsulfates and alkanesulfonates.

6. The process of claim 3 wherein the soluble catalyst is from about 0.02M to about 0.06M.

7. The process of claim 3 wherein the catalyst is an insoluble arylsulfonate.

8. The process of claim 3 wherein the insoluble catalyst is from about 1% to about 10% of the total weight of the reaction mixture.

9. The process of claim 3 wherein the reaction temperature is from about 60° C. to about 95° C. and the time of reaction is from about 1 to 48 hrs.

10. The process of claim 3 wherein the mineral acid is from about 0.02N to about 0.05N.

* * * * *